June 23, 1925.

C. C. HARRIS

FLANGED ROLL CAP

Filed Nov. 9, 1923

1,543,381

INVENTOR
Carl C. Harris
By Attorneys

Patented June 23, 1925.

1,543,381

UNITED STATES PATENT OFFICE.

CARL C. HARRIS, OF ORANGE, MASSACHUSETTS, ASSIGNOR TO RODNEY HUNT MACHINE COMPANY, OF ORANGE, MASSACHUSETTS, A CORPORATION OF MASSACHUSETTS.

FLANGED ROLL CAP.

Application filed November 9, 1923. Serial No. 673,788.

*To all whom it may concern:*

Be it known that I, CARL C. HARRIS, a citizen of the United States, residing at Orange, in the county of Franklin and State of Massachusetts, have invented a new and useful Flanged Roll Cap, of which the following is a specification.

This invention relates to a reinforcing and cap and journal for a solid wooden roll for use in textile, paper and other machinery. These rolls are put to hard usage because in many cases they work in liquid or have liquid come into contact with them and the temperature is raised and lowered, and there is also considerable bending load.

It has been customary heretofore to provide a bearing stud projecting from the end of certain of these rolls and to provide a separate ring at a distance from the center driven into the end of the roll with the grain to assist in holding the wood together and strengthen the end. Inside this wedges are driven for keeping the ring in place.

The principal object of this invention is to provide in a single element the ring which has been mentioned, the journal or support for the stud and an end piece covering the end of the roll, and at the same time to provide the end piece with means for receiving the lag-screws and wedges so that they will have to be driven in at proper distances apart for the purpose of holding the metal parts in position.

Other objects and advantages of the invention will appear hereinafter.

Reference is to be had to the accompanying drawings, in which

Figure 1:
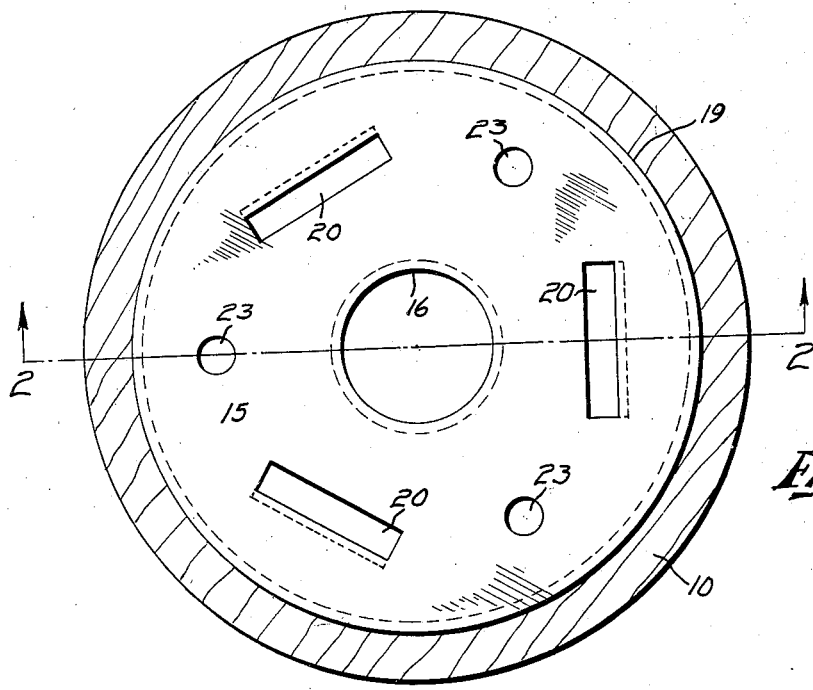
Fig. 1 is an end view of a wooden roll adapted for use on textile machinery and the like and provided with a preferred embodiment of this invention but not showing the shaft or stud in position.
Figure 2:
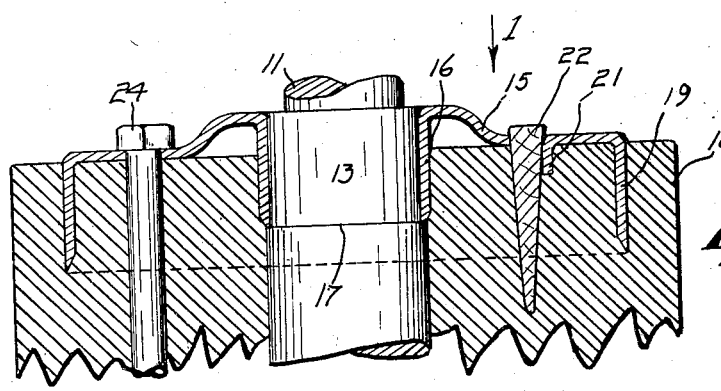
Fig. 2 is a diametrical sectional view on the line 2—2 of Fig. 1.
Figure 3:
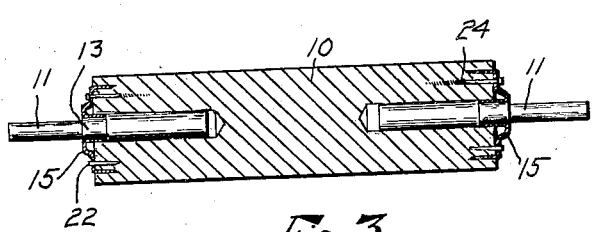
Fig 3 is a similar view of the entire roll on enlarged scale.

I have shown the invention as applied to an ordinary roll 10 preferably, consisting of a single piece of wood and having a pair of studs 11 extending in from opposite ends, although the invention is capable of application to a roll having a shaft extending all the way through. The studs are provided with cylindrical bearing surfaces 13 on which the roll has to be accurately turned.

For the purpose of accomplishing this I provide a plate 15 of sheet steel and form it with an inwardly extending cylindrical flange 16 at the center shaped in the press to just fit the bearing 13. This flange may have an outer beveled edge. The cylindrical portion 16 also extends inwardly just far enough preferably to come up against the shoulder 17 on the stud and force the stud further in. In this way the plate 15 is anchored firmly which will hold the stud against both sidewise and longitudinal motion and accurately center the roll at the end. The studs, of course, have bearings projecting beyond the roll on which the roll is adapted to rotate.

At the circumference of the circular plate 15 a flange 19 is turned down in the same direction as the flange 16. This is a circular flange like the flange 16 and concentric with it and its inner edge is beveled. In applying this plate to the end of the roll this flange is driven into the wood with the grain while the flange 16 simply goes into a bore in the end of the roll. This ring 19 constitutes a substitute for the ordinary ring which is usually applied at that point, but it is integral with the plate 15 and the central bearing ring 16. By beveling the edges, it is easier to drive it in, but the chief advantage is that the beveled edge has a tendency to crowd the wood into the inside of the flange. This increases the compression and makes a more rigid and permanent fit.

The plate 15 is provided with a series of rectangular perforations 20 arranged tangentially and provided by bending in a tongue of metal 21 after having cut out the opening on three sides. This tongue 21 of course is driven into the end of the wood when the plate 15 is applied. These three tongues in the present case, are at an angle to each other so that they assist in anchoring the whole device and help turn the roll. The openings 20 furnish spaces through which wedges 22 are introduced. As these openings are all spaced equally around the circumference they insure that the wedges will be inserted at equal distances apart and at the most effective angles and thus prevent the driving in of these wedges too near together or too far apart. This plate is also provided with perforations 23 for receiving and locating the lag screws 24 with which the plate is anchored to the roll.

By this construction the holding ring 19, being integrally connected with the inner ring 16 and plate 15, is more firmly fixed in place than has been the case heretofore, and the inner ring or flange 16 concentric with it is also accurately and firmly secured, being anchored positively by the ring 19. The wedges and lag screws are accurately spaced and the tongues 21 add to the holding power of the whole device.

Although I have illustrated and described only a single form of the invention I am aware of the fact that modifications can be made therein by any person skilled in the art without departing from the scope of the invention as expressed in the claims. Therefore I do not wish to be limited to all the details of construction herein shown and described, but what I do claim is:—

1. The combination with a wood roll and its supporting stud at the end, of a circular pressed metal plate on the end of the roll having an inner flange centering said stud with respect to the roll, and a second integral peripheral flange outside the first driven into the roll for securely holding the plate in position.

2. The combination with a wood roll and studs extending from the ends thereof, of a pressed metal plate located on each end of the roll and having a central circular flange projecting inwardly therefrom into the end of the roll and tightly fitting said stud and provided with an integral circular flange at its circumference driven into the end of the roll with the grain for anchoring the plate and inner flange.

3. The combination with a solid wood roll, of an end plate of pressed metal covering and protecting a large part of the end surface of the roll and having an integral flange projecting therefrom and driven into the end of the roll, the inner edge of the flange being beveled inwardly to crowd the wood within the flange.

4. The combination with a roll consisting of a single piece of wood and a stud extending from the end thereof, of a pressed steel plate located on the end of the roll and having a central circular flange projecting inwardly therefrom into the end of the roll and fitting said stud and provided with an integral circular flange at its circumference extending at right angles and driven into the end of the roll, said plate having a series of rectangular projections cut out on three sides and the metal bent inwardly at right angles on the fourth and driven into the end of the roll for receiving wedges therethrough to be driven into the roll.

5. As an article of manufacture, a flanged cap for application to a wooden roll comprising a circular plate of pressed metal having an integral circumferential flange at the edge adapted to be driven into the end of the roll and provided with a concentric circular flange at the center adapted to be received in the end of the roll and for receiving the stud or shaft of the roll and having a series of projections cut out from the body of the plate and bent inwardly at right angles to be driven into the roll and leaving perforations through the plate through which wedges may be inserted spaced around the roll in accordance with the positions of said projections.

6. As an article of manufacture, a flanged cap for application to a wooden roll comprising a plate of pressed metal having a flange at the edge adapted to be driven into the end of the roll and provided with a series of projections cut out from the body of the plate and bent inwardly at right angles to be driven into the roll and leaving perforations through the plate through which wedges may be inserted spaced around the roll in accordance with the positions of said projections, and having perforations for locating and receiving additional securing means.

7. As an article of manufacture, a wood roll having at the end a pressed metal cap circular in shape and provided with a cylindrical flange at its circumference setting down into the end of the roll, so that the cap is located on the end surface of the roll, said cap having perforations therethrough with the metal therefrom turned down to form flat flanges at right angles to the plain of the cap and arranged transverse to a radial line to the center of the perforations, and wedges of the same shape as said perforations driven in to the roll through the perforations, whereby said wedges are anchored to the plate and directly bind the same by the perforations and especially the flanges.

8. The combination with a solid wood roll having a flat end, of an end plate of pressed metal covering a part of the end of the roll and having an integral flange at its periphery driven into the end of the roll, said plate having a series of perforations with lag screws extending through said perforations and into the roll to positively hold the plate in position, and a series of rectangular perforations through the plate each having a flange extending into the roll, and wedges driven through the rectangular perforations into the roll and held by said flanges against displacement.

In testimony whereof I have hereunto affixed my signature.

CARL C. HARRIS.